(12) United States Patent
Baek

(10) Patent No.: US 12,062,312 B2
(45) Date of Patent: Aug. 13, 2024

(54) DISPLAY APPARATUS AND POWER CONTROLLING METHOD THEREFOR

(71) Applicant: LG ELECTRONICS INC., Seoul (KR)

(72) Inventor: Seunghun Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/018,449

(22) PCT Filed: Jul. 28, 2020

(86) PCT No.: PCT/KR2020/009959
§ 371 (c)(1),
(2) Date: Jan. 27, 2023

(87) PCT Pub. No.: WO2022/025309
PCT Pub. Date: Feb. 3, 2022

(65) Prior Publication Data
US 2023/0230518 A1 Jul. 20, 2023

(51) Int. Cl.
*G09G 3/20* (2006.01)
(52) U.S. Cl.
CPC .......... *G09G 3/20* (2013.01); *G09G 2330/021* (2013.01)
(58) Field of Classification Search
CPC ........... G09G 2330/021; G09G 3/3208; G09G 2330/023; G09G 2330/00; G09G 2360/08; G09G 2360/04; G09G 2360/122; G09G 2300/026; H10K 59/10; H10K 59/12
See application file for complete search history.

(56) References Cited

U.S. PATENT DOCUMENTS

| 4,859,910 | A  | * | 8/1989  | Iwakawa | G09G 3/2932 |
|-----------|----|---|---------|---------|-------------|
|           |    |   |         |         | 345/60      |
| 6,373,730 | B1 | * | 4/2002  | Komatsu | H02M 3/33507 |
|           |    |   |         |         | 363/41      |
| 9,224,327 | B2 | * | 12/2015 | Hyeon   | G09G 3/3208 |
| 10,332,474| B2 | * | 6/2019  | Joo     | G09G 3/3696 |
| 10,644,602| B2 | * | 5/2020  | Jang    | H02M 3/33507 |

(Continued)

FOREIGN PATENT DOCUMENTS

| KR | 10-2013-0076678 A | 7/2013 |
|----|-------------------|--------|
| KR | 10-2017-0120419 A | 10/2017 |

(Continued)

*Primary Examiner* — Amy Onyekaba
(74) *Attorney, Agent, or Firm* — Birch, Stewart, Kolasch & Birch, LLP

(57) ABSTRACT

An embodiment of the disclosure provides a display apparatus operating at high frequency, the display apparatus comprising: a display module; a control board that obtains load information; and a power board that supplies an output voltage to the display module and the control board considering the load information, the power board comprising a power factor correction (PFC) circuit, a switching unit, an LLC resonant circuit, a transformer, and a power controller, wherein, when a load according to the load information is less than a light load reference value, the power controller adjusts the switching operation of the switching unit or a PFC output voltage of the PFC circuit to suppress the increase in gain for the output voltage.

13 Claims, 15 Drawing Sheets

(56) References Cited

U.S. PATENT DOCUMENTS

| | | | | |
|---|---|---|---|---|
| 2006/0001613 A1* | 1/2006 | Routley | G09G 3/3216 | 345/76 |
| 2012/0200228 A1* | 8/2012 | Fujita | H05B 45/355 | 315/161 |
| 2013/0169697 A1* | 7/2013 | Park | G09G 3/2081 | 345/83 |
| 2014/0092075 A1* | 4/2014 | Lee | G05F 1/468 | 345/212 |
| 2014/0191281 A1* | 7/2014 | Yamaji | H01L 29/7393 | 257/341 |
| 2014/0354168 A1* | 12/2014 | Hyeon | G09G 3/3406 | 345/212 |
| 2015/0154917 A1* | 6/2015 | Jung | G09G 3/342 | 345/102 |
| 2016/0358526 A1* | 12/2016 | Wang | G09G 3/3208 | |
| 2017/0076676 A1* | 3/2017 | Hadwen | G02B 26/005 | |
| 2017/0192065 A1* | 7/2017 | Lee | G09G 3/3283 | |
| 2017/0221413 A1* | 8/2017 | Hoffman | G09G 3/36 | |
| 2017/0310224 A1* | 10/2017 | Joo | G09G 3/3406 | |
| 2018/0136894 A1* | 5/2018 | Lee | G09G 5/14 | |
| 2019/0149761 A1* | 5/2019 | Cai | G09G 3/3208 | 348/730 |
| 2019/0157910 A1* | 5/2019 | Choi | H02M 3/28 | |
| 2019/0172379 A1* | 6/2019 | Park | H02M 3/158 | |
| 2019/0340965 A1* | 11/2019 | Chang | G09G 3/006 | |
| 2020/0074920 A1* | 3/2020 | Lee | G09G 3/3208 | |
| 2020/0152121 A1* | 5/2020 | Sung | G09G 3/3275 | |
| 2020/0267344 A1* | 8/2020 | Li | G06F 1/26 | |
| 2021/0099083 A1* | 4/2021 | Kim | G09G 3/3208 | |
| 2022/0158548 A1* | 5/2022 | Jang | G09G 3/20 | |

FOREIGN PATENT DOCUMENTS

| | | |
|---|---|---|
| KR | 10-2019-0066104 A | 6/2019 |
| KR | 10-2019-0106438 A | 9/2019 |

* cited by examiner

DISPLAY APPARATUS AND POWER CONTROLLING METHOD THEREFOR

CROSS REFERENCE TO RELATED APPLICATIONS

This application is the National Phase of PCT/KR2020/009959 filed on Jul. 28, 2020, which is hereby expressly incorporated by reference into the present application.

TECHNICAL FIELD

The present disclosure relates to a display apparatus and a power controlling method therefor.

BACKGROUND ART

When supplying power to a display apparatus, an LLC topology capable of ZVS (Zero Voltage Switching) operation is used to realize high-efficiency power density. That is, the display apparatus may supply power using a DC-DC converter including an LLC resonance circuit. An inductor L included in the LLC resonance circuit is characterized in that its size may be reduced when an operating frequency is increased.

Recently, as the number of pixels of a display apparatus increases, such as in a 4K/8K TV, the display apparatus consumes more power. In the case of using the conventional design method, the size of the power board of the display apparatus also increases in order to increase the power capacity. If the operating frequency of the LLC resonance circuit may be increased, the size of the LLC resonance circuit can be reduced, and thus the converter can be miniaturized. However, when the operating frequency is high, the parasitic capacitance of a transformer and a secondary rectifier circuit affects the operation of the LLC resonance circuit, so that an output voltage rises under a light load.

INVENTION

Technical Problem

An object of the present disclosure is to provide a display apparatus that suppresses an increase in output voltage even at a high frequency and a low load, and a power controlling method therefor.

Another object of the present disclosure is to provide a display apparatus that suppresses an increase in output voltage even at a high frequency and a low load while supporting a DPC (Dynamic Power Control) mode for power consumption reduction and a power controlling method therefor.

Technical Solution

An embodiment of the present disclosure provides a display apparatus operating at a high frequency comprising a power controller for adjusting switching operation of a switching unit or a PFC output voltage of a PFC circuit to suppress an increase in gain for an output voltage when a load according to the load information is less than a light load reference value, and a power controlling method therefor.

In this case, the power controller may intermittently control switching of the switching unit when an output feedback voltage is greater than a first burst threshold.

In this case, the power controller may compare the output feedback voltage with a second burst threshold when a DPC mode is in an ON state, and intermittently control switching of the switching unit when the output feedback voltage is greater than the second burst threshold, and the second burst threshold may be less than the first burst threshold.

In this case, the power controller may determine a target PFC output voltage based on the load information, and adjust the PFC output voltage to the target PFC output voltage.

In this case, the power controller may determine the target PFC output voltage to decrease as the load decreases.

In this case, the power controller may determine the target PFC output voltage based on the DPC mode information.

In this case, the power controller may determine the target PFC output voltage when the DPC mode is in an ON state to be less than the target PFC output voltage when the DPC mode is in an OFF state.

In this case, the power controller may generate a switch control signal based on the DPC mode information, and control switching of the switching unit using the switch control signal.

In this case, the power controller may generate the switch control signal without a pulse skip period when the DPC mode is in an OFF state.

In this case, the power controller may generate the switch control signal including the pulse skip period at regular intervals when the DPC mode is in an ON state.

In this case, a frequency of the switch control signal may be the same when the DPC mode is in an ON state and when the DPC mode is in an OFF state.

In this case, the operating frequency of the display apparatus may be 300 kHz or more.

Effect of the Invention

According to various embodiments of the present disclosure, even if an operating frequency of an LLC resonance circuit increases, it is possible to suppress a phenomenon in which an output voltage abnormally rises in a low load situation.

In addition, according to various embodiments of the present disclosure, a DPC mode for power consumption reduction may be provided while suppressing a phenomenon in which an output voltage abnormally rises in a high-frequency low-load situation.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" or "unit" may be used to refer to elements or components. Use of such a suffix herein is merely intended to facilitate description of the specification, and the suffix itself is not intended to have any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

While ordinal numbers including 'first', 'second', etc. may be used to describe various components, they are not intended to limit the components. These expressions may be used to distinguish one component from another component.

When it is said that a component is 'coupled with/to' or 'connected to' another component, it should be understood that the one component is connected to the other component directly or through any other component in between. On the other hand, when it is said that a component is 'directly connected to' or 'directly coupled to' another component, it should be understood that there is no other component between the components.

Figure 1:
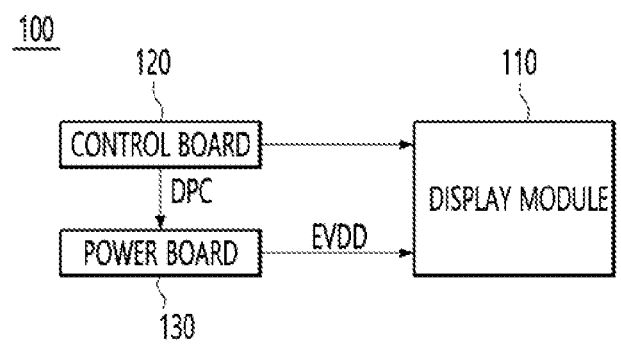
FIG. 1 is a block diagram illustrating a display apparatus according to an embodiment of the present disclosure.

FIG. 1 is a block diagram illustrating a display apparatus 100 according to an embodiment of the present disclosure.

Referring to FIG. 1, a display apparatus 100 according to an embodiment of the present disclosure may include a control board 120, a power board 130, and a display module 110.

The control board 120 may be referred to as a control unit, controller, processor, CPU, and the like. The power board 130 may be referred to as a power supply, a power supply unit, a power management unit, and a power controller. The display module 110 may be referred to as a display, a display unit, a display block, a display section, an image display device, an image device, and the like.

The control board 120 may be in charge of overall management and control of the display apparatus 100. For example, the control board 120 may control the display module 110 to display an image, control the power board 130 to stably supply a DC voltage EVDD to the display module 110, and control the display apparatus 100 to obtain state information of the display apparatus 100 based on various types of detection signals received from the display apparatus 100 and to take action corresponding to the state information.

The control board 120 may provide a dynamic power control (DPC) mode for power consumption reduction. The DPC mode may refer to a mode in which power consumption of the display panel 118 is reduced by intermittently switching a switching unit 132.

In an embodiment, the control board 120 may generate a power control signal considering whether the DPC mode is activated and load information of the display panel 118 and transmit the generated power control signal to the power board 130, and the power board 130 may generate an output voltage EVDD based on the transmitted power control signal and supply it to the display module 110. Alternatively, in another embodiment, the control board 120 may transmit load information and DPC mode information of the display panel 118 to the power board 130, and the power board 130 may directly generate an output voltage EVDD considering load information of the display panel 118 based on the transmitted load information and DPC mode information and supply it to the display module 110.

The load of the display panel 118 may refer to the amount of energy consumed by the display panel 118 and may be determined by driving current used to display an image on the display panel 118. For example, when the display panel 118 requires large driving current, the load may be large, and, when the display panel 118 requires small driving current, the load may be small.

For example, when most of a plurality of pixels of the display panel 118 display a white grayscale image, since maximum driving current is required for each pixel to display the white grayscale image, a sum of driving currents required for most of the pixels of the display panel 118 may be large, which may mean a large load. Conversely, when most of the plurality of pixels of the display panel 118 display a black grayscale image, since minimum driving current for each pixel, for example, 0 mA or a current value close thereto, may be required to display the black grayscale image, the sum of driving currents required for most of the pixels of the display panel 118 may be small, which may mean that the load is small. In the above, it has been described that the load may be large when displaying a white grayscale image and the load may be small when displaying a black grayscale image, but the opposite case is also possible.

Figure 2:
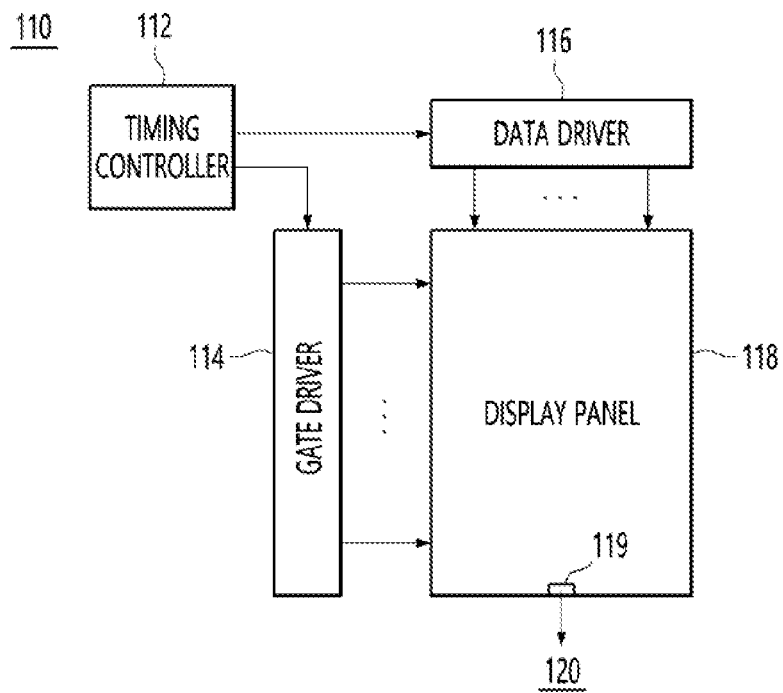
FIG. 2 is a block diagram illustrating an example of a display module shown in FIG. 1.

FIG. 2 is a block diagram illustrating an example of the display module 110 shown in FIG. 1.

Referring to FIG. 2, the display module 110 may include a timing controller 112, a gate driver 114, a data driver 116, and a display panel 118. If the display panel 118 is a liquid crystal display (LCD) panel, the display module 110 may further include a backlight unit (not shown).

The display panel 118 may include a plurality of pixels to display image or video based on a driving current. The display panel 118 may be an LCD panel or Organic Light Emitting Diodes (OLED) display panel.

The timing controller 112 may output a gate control signal to control the gate driver 114, and a data control signal to control the data driver 116.

The gate driver 114 may supply a gate signal such as a scan signal, in response to the gate control signal, to the display panel 118. The display panel 118 may activate a pixel according to the scan signal. The activation of the pixel may mean that an image signal is supplied to a corresponding pixel. If at least one of switch is included in each pixel, the activation of the pixel may mean that the corresponding switching unit is turned on by the scan signal.

The data driver 116 may supply an image signal to the display panel 118 in frame unit according to the data control signal.

Each of the plurality of pixels included in the display panel 118 may output an image by operating based on a data signal supplied from the data driver 116 and a gate signal supplied from the gate driver 114. When the display panel 118 is an LCD panel, light emitted from a backlight unit (not shown) may pass through a color filter of each pixel and output an image. When the display panel 118 is an OLED panel, light directly emitted from each pixel may output an image.

Figure 3:
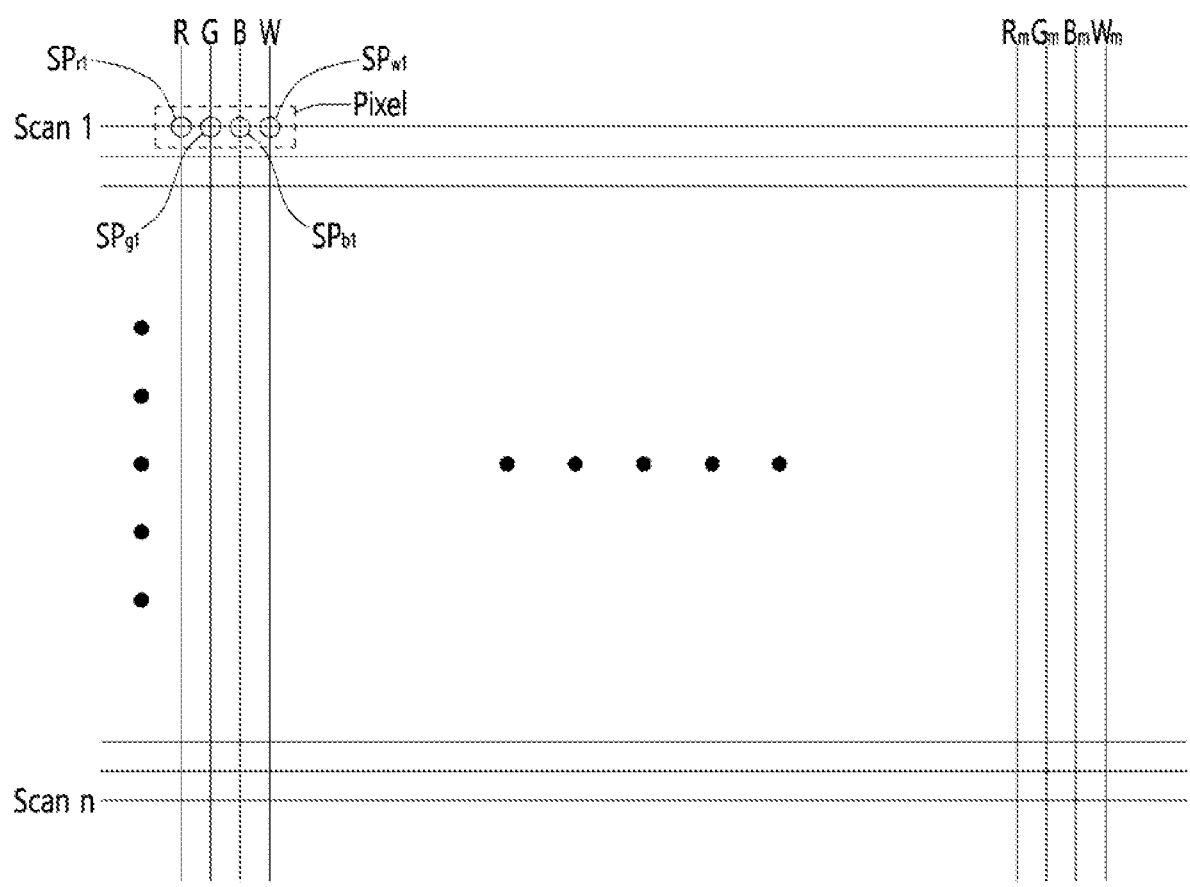
FIG. 3 is a diagram illustrating a layout structure of a display panel according to an embodiment of the present disclosure.

The display panel 118 may include one or more sensing units 119, and the sensing unit 119 may detect a driving current flowing in a pixel of the display panel 118. For example, the sensing unit 119 may be connected to the data line (R1, G1, B1, W1~Rm, Gm, Bm, Wm), which is shown in FIG. 3. The sensing units 119 may detect a load of the display panel 118 and transmit load information to the control board 120. For example, the sensing units 119 may detect a stat of the load by measuring a driving current flowing on the data lines (R1, G1, B1, W1~Rm, Gm, Bm, and Wm). Alternatively, the control board 120 may generate load information based on the output image data.

FIG. 3 is a diagram illustrating a layout structure of a display panel 118 according to an embodiment of the present disclosure.

Referring to FIG. 3, the display panel 118 may include a plurality of pixels. And, the plurality of subpixels (SPr1, SPg1, SPb1, SPw1) may be configured to configure one group pixel. Each of the sub-pixels (SPr1, SPg1, SPb1, and SPw1) may include an organic light emitting device or a color filter capable of implementing different colors.

Figure 4:
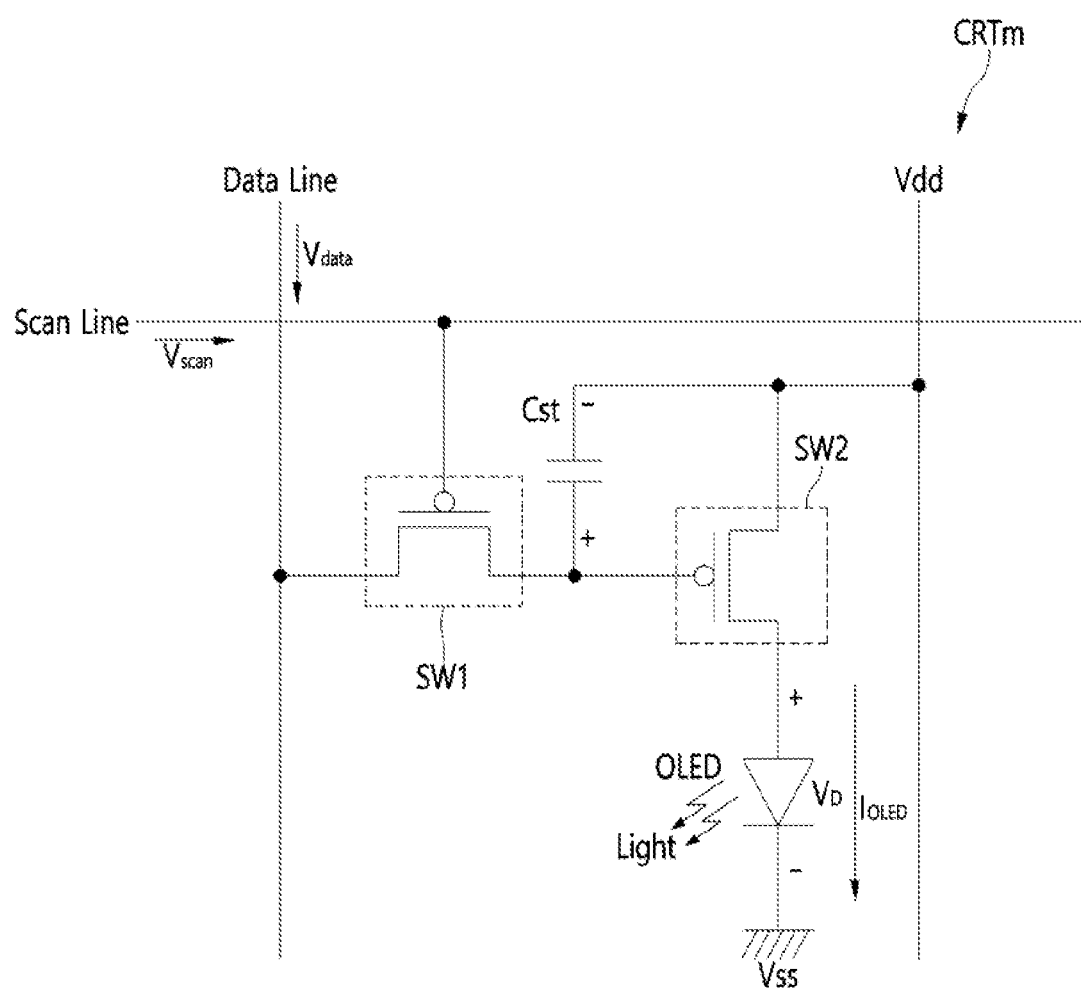
FIG. 4 is a diagram illustrating a structure of a unit pixel according to an embodiment of the present disclosure.

FIG. 4 is a diagram illustrating a structure of a unit pixel according to an exemplary embodiment of the present disclosure.

Referring to FIG. 4, each pixel (CRTm) may include a scan switching element (SW1), a storage capacitor (Cst), a driving switching element (SW2), and an organic light emitting diode (OLED).

The scan switching element (SW1) may be turned on according to a scan signal (Vscan) input from the gate driver 114 by having a scan line connected to a gate terminal thereof. When the scan switching element (SW1) is turned on, the image signal (Vdata) input from the data driver 116 is transmitted to the gate terminal of the driving switching element (SW2) or one end of the storage capacitor (Cst).

The storage capacitor (Cst) may be formed between the gate terminal and the source terminal of the driving switching element (SW2), and store a predetermined difference of between the image signal level transmitted to one end of the storage capacitor (Cst) and the DC power (Vdd) level transmitted to the other end of the storage capacitor (Cst). For example, when image signals have different levels according to a PAM (Pulse Amplitude Modulation) method, the power level stored in the storage capacitor (Cst) may vary according to the level difference of the video signal (Vdata). As another example, when image signals have different pulse widths according to a PWM (Pulse Width Modulation) method, the power level stored in the storage capacitor (Cst) may vary according to the pulse width difference of the video signal (Vdata).

The driving switching element (SW2) may be turned on according to the power level stored in the storage capacitor (Cst). When the driving switching element (SW2) may be turned on, a driving current ($I_{OLED}$) proportional to the stored power level flows through the organic light emitting diode (OLED). Accordingly, the OLED may emit light.

The OLED may include an RGBW light emitting layer (EML) corresponding to a sub-pixel, and include at least one of a hole injection layer (HIL), a hole transport layer (HTL), an electron transport layer (ETL), and an electron injection layer (EIL). In addition, a hole blocking layer and the like may be included in the OLED.

Each subpixel (sub pixel) may output white light from the OLED and may include a separate color filter for color implementation. In the case of the green, red, and blue subpixels ($SP_{r1}$, $SP_{g1}$, and $SP_{b1}$), separate color filters may be provided to implement colors. On the other hand, since the white subpixel ($SP_{w1}$) may output white light, a separate color filter may not be provided.

Meanwhile, in FIG. 4, the case where the scan switching element (SW1) and the driving switching element (SW2) may be p-type MOSFETs is exemplified, but n-type MOSFETs or other switching elements such as JFET, IGBT, or SIC may be used.

Figure 5:
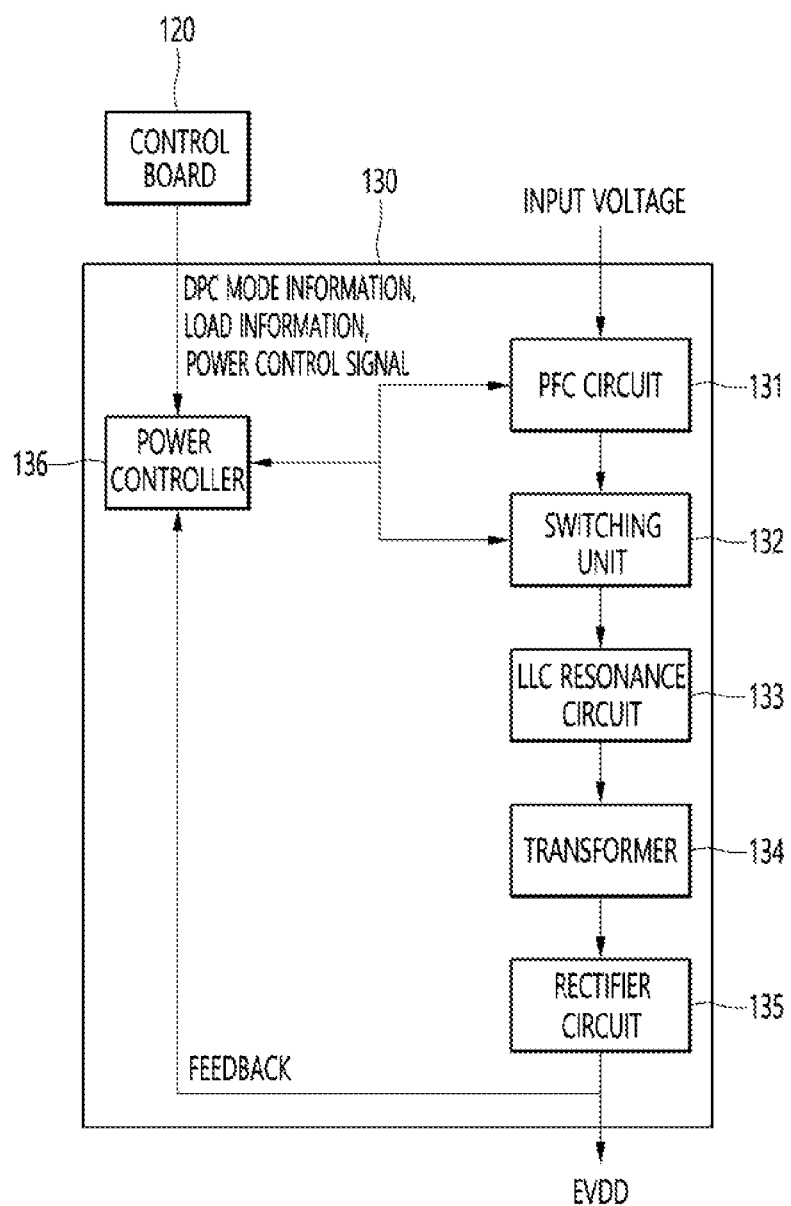
FIG. 5 is a block diagram illustrating a power board according to an embodiment of the present disclosure.

FIG. 5 is a block diagram illustrating a power board 130 according to an embodiment of the present disclosure.

Referring to FIG. 5, the power board 130 may include a PFC circuit 131, a switching unit 132, an LLC resonance circuit 133, a transformer 134, a rectifier circuit 135 and a power controller 136.

The PFC circuit 131 may be a power factor correction circuit, and refer to a circuit that corrects the power factor of input power (or input voltage) and outputs it. The switching unit 132 may include at least one or more switches (e.g., two switches), and supply a voltage according to a switching operation under the control of the power controller 136 to the LLC resonance circuit 133. The LLC resonance circuit 133, the transformer 134 and the rectifier circuit 135 may generate an output direct current voltage EVDD. The LLC circuit 133 may also be referred to as a resonance tank.

The power controller 136 may control the switching unit 132 through a switch control signal, and the switch control signal may input first output (or Ho output) for controlling a first switch included in the switching unit 132 and second output (or Lo output) for controlling a second switch included in the switching unit 32.

The power controller 136 may receive the output DC voltage EVDD as feedback and receive DPC mode information (or DPC mode activation information) or load information from the control board 120. Also, the power controller 136 may control operation of the PFC circuit 131 or the switching unit 132 in consideration of the received DPC mode information, load information, or feedback. For example, the power controller 136 may control operation of one or more switches included in the switching unit 132 by generating a switch control signal and transmitting the generated switch control signal to the switching unit 132.

For example, the power controller 136 may adjust the output voltage of the PFC circuit 131.

Conventionally, the operating frequency of the LLC resonance circuit 133 was about 80 to 120 kHz, but with the development of control ICs and switching devices, the operating frequency of the LLC resonance circuit 133 is possible up to 2 MHz. However, as described above, there is a problem that the output voltage increases when the operating frequency increases, and to solve this problem, a method of adding a passive element R-C to the LLC resonance circuit 133 may be used. However, when a passive element is used, power loss occurs due to the passive element, resulting in low power efficiency. Accordingly, the present disclosure may propose a method of solving the problem that the output voltage increases due to high-frequency operation at a low load by changing the operating frequency in consideration of the load. In the present disclosure, an operating frequency being greater than about 300 kHz may be referred to as a high frequency, and it is assumed that the display apparatus 100 operates at a high frequency.

Figure 6:
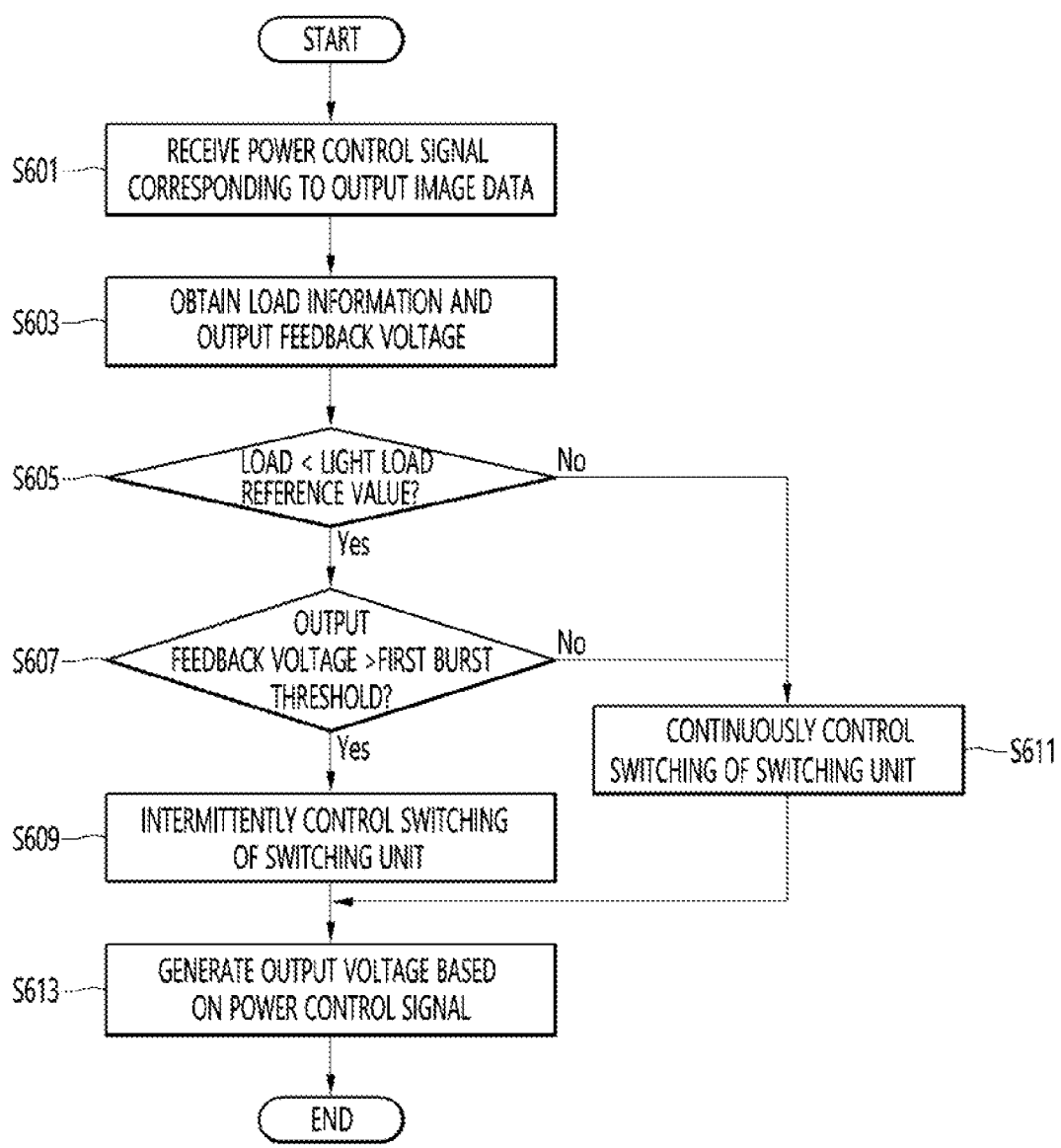
FIG. 6 is an operational flowchart illustrating a power controlling method of a display apparatus according to an embodiment of the present disclosure.

FIG. 6 is an operational flowchart illustrating a power controlling method of a display apparatus 100 according to an embodiment of the present disclosure.

Referring to FIG. 6, the power controller 136 of the display apparatus 100 may receive a power control signal corresponding to output image data (S601).

The control board 120 may generate a power control signal corresponding to the output image data and transmit the generated power control signal to the power controller 136.

Then, the power controller 136 of the display apparatus 100 may obtain load information and an output feedback voltage (S603).

The control board 120 may generate load information corresponding to the output image data or obtain load information measured by the sensor 119, and the power controller 136 may receive the load information from the control board 120.

The power controller 136 may receive a secondary-side feedback voltage, and the secondary-side feedback voltage may mean an output feedback voltage.

Then, the power controller 136 of the display apparatus 100 may determine whether the load according to the load information is less than a light weight reference value (S605).

The light load reference value may be a reference value for determining whether the load of the display panel 118 is a light load, and may be a preset value.

If the load is less than the light load reference value as a result of determination in step S605, the power controller 136 of the display apparatus 100 may determine whether the output feedback voltage is greater than a first burst threshold (S607).

The first burst threshold may mean a burst threshold when the DPC mode is in an off state.

When the output feedback voltage is greater than the first burst threshold as a result of determination in step S607, the power controller 136 of the display apparatus 100 may intermittently control the switching of the switching unit 132 (S609).

Since the operating frequency of the LLC resonance circuit 133 is a high frequency of about 300 kHz or more, when the load of the display panel 118 is a light load, the secondary-side output voltage may increase due to parasitic capacitance of the transformer 134 and the rectifier circuit 135. In the present disclosure, the secondary-side output voltage may be lowered by intermittently switching the switching unit 132, and through this, it is possible to prevent a problem in which the secondary-side output voltage increases during light-load and high-frequency operation. A case in which the switching unit 132 may be intermittently switched may be referred to as the switching unit 132 operating in a burst mode. Contrary to the burst mode, the switching unit 132 being continuously switched may be referred to as the switching unit 132 operating in a normal mode.

Intermittently switching the switching unit 132 may mean repeating a process of performing switching at a constant period or a constant frequency and a process of stopping switching. For example, intermittently switching the switching unit 132 may mean repeating a process of performing switching during a first period and stopping switching during a second period.

If the load is not less than the light load reference value as a result of determination in step S605 or the output feedback voltage is not greater than the first burst threshold as a result of determination in step S607, the power controller 136 of the display apparatus 100 may continuously control switching of the switching unit 132 (S611).

The case where the output feedback voltage is not greater than the first threshold includes a case where the output feedback voltage is not greater than the first threshold as switching of the switching unit 132 is performed intermittently.

Continuously switching the switching unit 132 may mean performing switching without stopping. Since the output feedback voltage is not greater than the first burst threshold, the secondary-side output voltage may be not excessively high, and therefore, it is sufficient even if the switching unit 132 normally performs switching.

Then, the power controller 136 of the display apparatus 100 may generate an output voltage EVDD based on the power control signal (S613).

The generated output voltage EVDD may be supplied to the display module 110.

Although, in FIG. 6, step S613 of generating the output voltage based on the power control signal is shown as being performed after the steps S603 to S611 of controlling switching of the switching unit 132 in consideration of the load information and the output feedback voltage are performed, steps S603 to S611 of controlling switching of the switching unit 132 in consideration of the load information and the output feedback voltage may be regarded as being performed in parallel with step S613 of generating an output voltage based on the power control signal.

FIG. 6 is a diagram illustrating only one cycle of a process of controlling switching of the switching unit 132 in consideration of the load information, and the steps shown in FIG. 6 may be repeatedly performed. Also, some of steps S601 to S613 shown in FIG. 6 may be reversed in order or performed in parallel.

Figure 7:
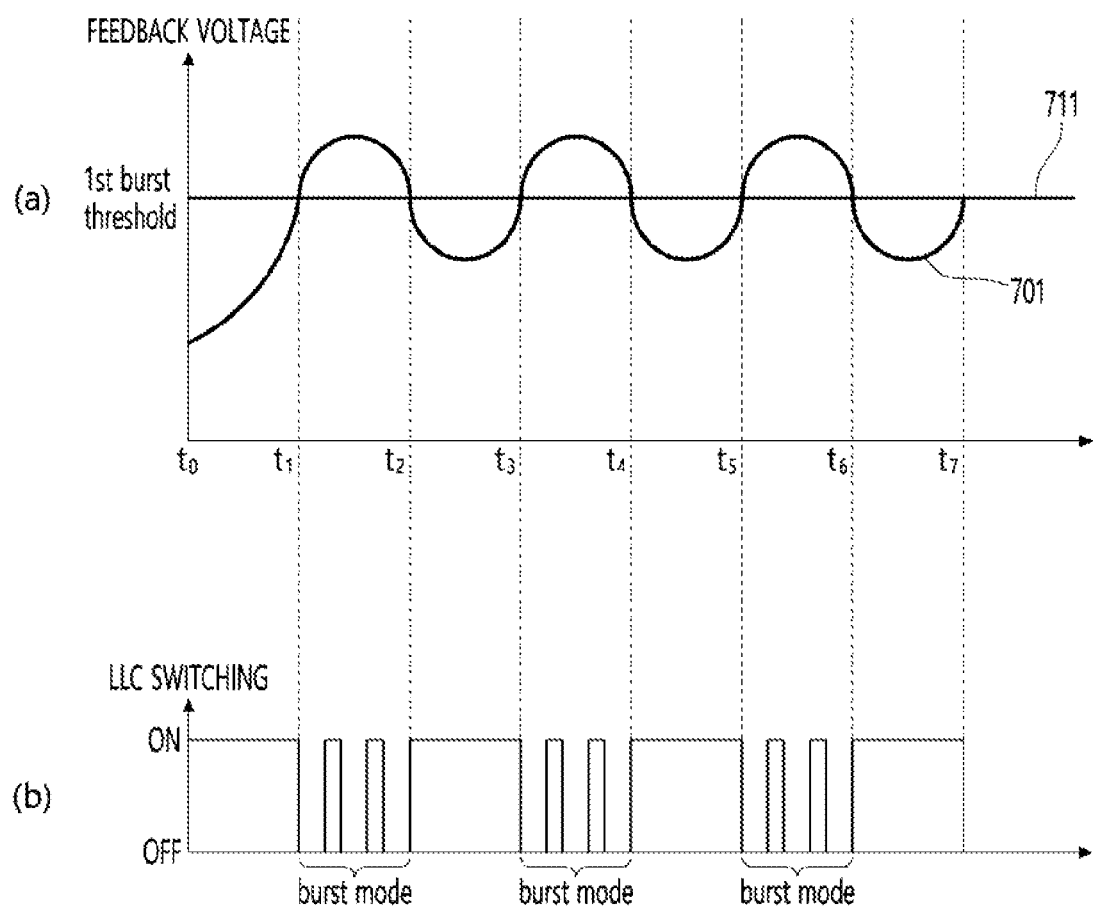
FIG. 7 is a view illustrating a power controlling method of a display apparatus according to the embodiment shown in FIG. 6.

FIG. 7 is a view illustrating a power controlling method of a display apparatus 100 according to the embodiment shown in FIG. 6.

(a) of FIG. 7 illustrates the output feedback voltage, and (b) of FIG. 7 illustrates switching operation of the switching unit 132. In addition, in FIG. 7, a situation where the operating frequency is a high frequency and it is a light load is assumed.

Referring to FIG. 7, in a first period $t_0$ to $t_1$, the output feedback voltage 701 may increase as the switching unit 132 operates in a normal mode, and at a time point $t_1$, the output feedback voltage 701 may reach a first burst threshold 711.

The switching unit 132 operating in the normal mode may mean that the switching unit 132 continuously performs switching.

In a second period $t_1$ to $t_2$, the output feedback voltage 701 may become higher than the first burst threshold 711, and accordingly, the power controller 136 may operate the switching unit 132 in a burst mode. The switching unit 132 operating in the burst mode may mean that the switching unit 132 intermittently performs switching, and accordingly, in the second period $t_1$ to $t_2$, a process of performing switching and a process of stopping switching may be alternately performed. In the second period $t_1$ to $t_2$, the output feedback voltage 701 may decrease as the switching unit 132 operates in the burst mode, and at the time point $t_2$, the output feedback voltage 701 may reach the first burst threshold 711.

In a third period $t_2$ to $t_3$, the output feedback voltage 701 may become smaller than the first burst threshold 711, and accordingly, the power controller 136 may operate the switching unit 132 in the normal mode. In the third period $t_2$ to $t_3$, the output feedback voltage 701 may increase as the switching unit 132 operates in the normal mode, and at a time point $t_3$, the output feedback voltage 701 may reach the first burst threshold 711.

Operations in a fourth period $t_3$ to $t_4$ and a sixth period $t_5$ to $t_6$ may be the same as those in the second period $t_1$ to $t_2$, and operations in a fifth period $t_4$ to $t_5$ and a seventh period $t_6$ to $t_7$ are the same as those in the third period $t_2$ to $t_3$.

Figure 8:
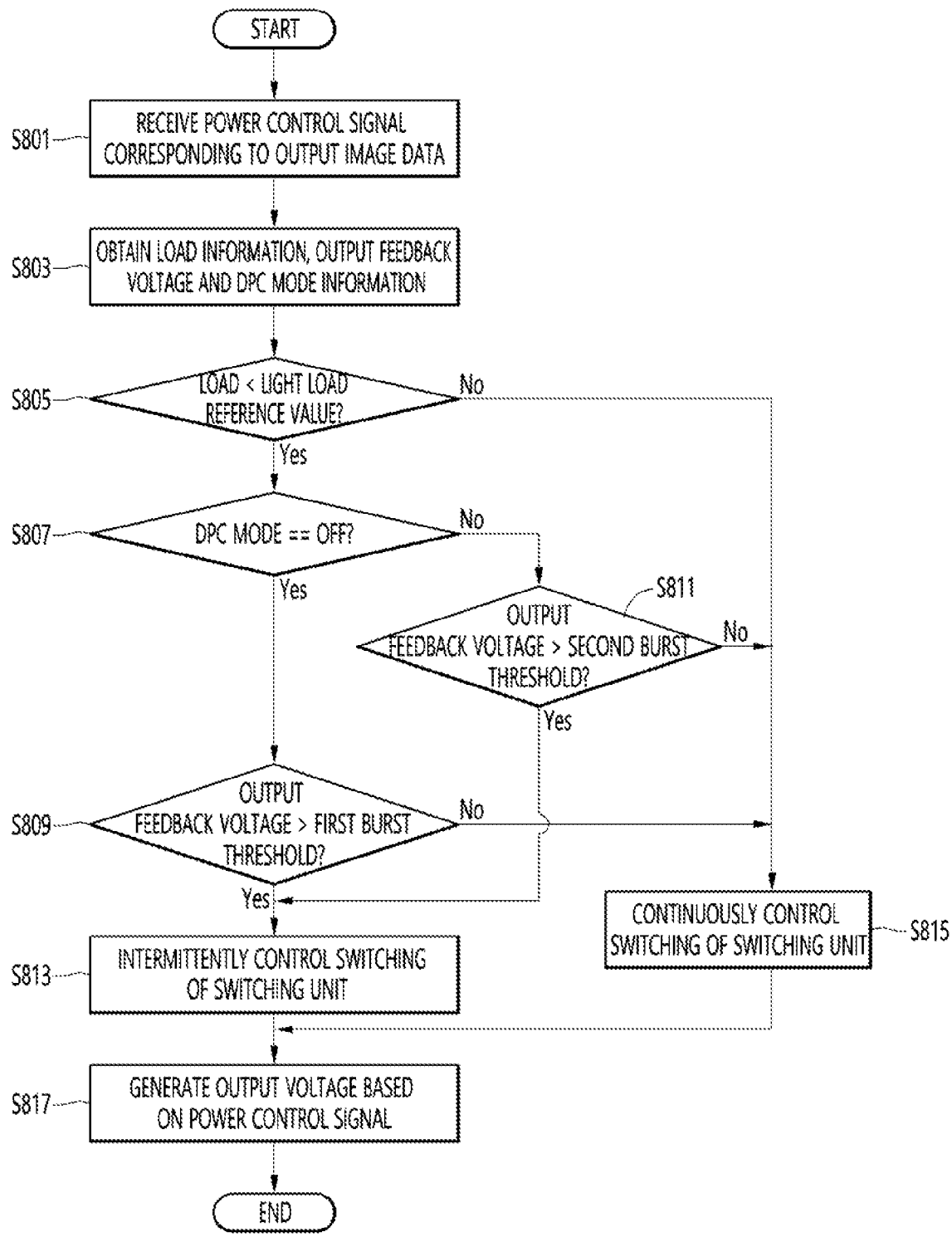
FIG. 8 is an operational flowchart illustrating a power controlling method of a display apparatus according to an embodiment of the present disclosure.

FIG. 8 is an operational flowchart illustrating a power controlling method of a display apparatus 100 according to an embodiment of the present disclosure.

The power controlling method of the display apparatus 100 shown in FIG. 8 illustrates the method of controlling the power of the display apparatus 100 by additionally considering the DPC mode for reducing power consumption, compared to the power controlling method of the display apparatus 100 shown in FIG. 6.

Referring to FIG. 8, the power controller 136 of the display apparatus 100 may receive a power control signal corresponding to output image data (S801).

Then, the power controller 136 of the display apparatus 100 may obtain load information, an output feedback voltage, and DPC mode information (S803).

The power controller 136 may obtain the DPC mode information from the control board 120. The DPC mode information may indicate that the DPC mode is in an ON state (or an activated state) or that the DPC mode is in an OFF state (or a deactivated state).

Then, the power controller 136 of the display apparatus 100 may determine whether the load according to the load information is less than a light load reference value (S805).

If the load is less than the light load reference value as a result of determination in step S805, the power controller 136 of the display apparatus 100 may determine whether the DPC mode is in an OFF state (S807).

The DPC mode may refer to a mode in which the switching unit 132 is intermittently switched to reduce power consumption. The present disclosure proposes a method of intermittently switching the switching unit 132 in order to prevent an increase in output voltage when the display apparatus 100 operates at a high frequency in a low load state, which is similar to the operation method of the switching unit 132 in a conventional DPC mode. Accordingly, the power controller 136 may control operation of the switching unit 132 by additionally considering whether the DPC mode for power consumption reduction is activated.

When the DPC mode is in an OFF state as a result of determination in step S807, the power controller 136 of the display apparatus 100 may determine whether the output feedback voltage is greater than the first burst threshold (S809).

The first burst threshold may mean a burst threshold when the DPC mode is in an OFF state.

As a result of determination in step S807, when the DPC mode is not in an OFF state (when the DPC mode is in an ON state), the power controller 136 of the display apparatus 100 may determine whether the output feedback voltage is greater than a second burst threshold (S811).

The second burst threshold may mean a burst threshold when the DPC mode is in an ON state. When the DPC mode is in an ON state, since the output voltage shall be reduced to reduce power consumption compared to when the DPC mode is in an OFF state, the second burst threshold for determining whether the switching unit 132 operates in the burst mode may be set to less than the first burst threshold.

When the output feedback voltage is greater than the first burst threshold as a result of determination in step S809 or the output feedback voltage is greater than the second burst threshold as a result of determination in step S811, the power controller 136 of the display apparatus 100 may intermittently control switching of the switching unit 132 (S813).

When the load is not less than the light load reference value as a result of determination in step S805, when the output feedback voltage is not greater than the first burst threshold as a result of determination in step S809, or when the output feedback voltage is not greater than the second burst threshold as a result of determination in step S811, the power controller 136 of the display apparatus 100 may continuously control switching of the switching unit 132 (S815).

Then, the power controller 136 of the display apparatus 100 may generate an output voltage EVDD based on the power control signal (S817).

The generated output voltage EVDD may be supplied to the display module 110.

Although, in FIG. 8, step S817 of generating the output voltage based on the power control signal is shown as being performed after the steps S803 to S815 of controlling switching of the switching unit 132 in consideration of the load information, the output feedback voltage and the DPC mode are performed, S803 to S815 of controlling switching of the switching unit 132 in consideration of the load information, the output feedback voltage and the DPC mode may be regarded as in parallel with step S817 of generating the output voltage based on the power control signal.

FIG. 8 is a diagram illustrating only one cycle of a process of controlling switching of the switching unit 132 in consideration of the load information and the DPC mode, and the steps shown in FIG. 8 may be repeatedly performed. Also, some of steps S801 to S817 shown in FIG. 8 may be reversed in order or performed in parallel.

Figure 9:
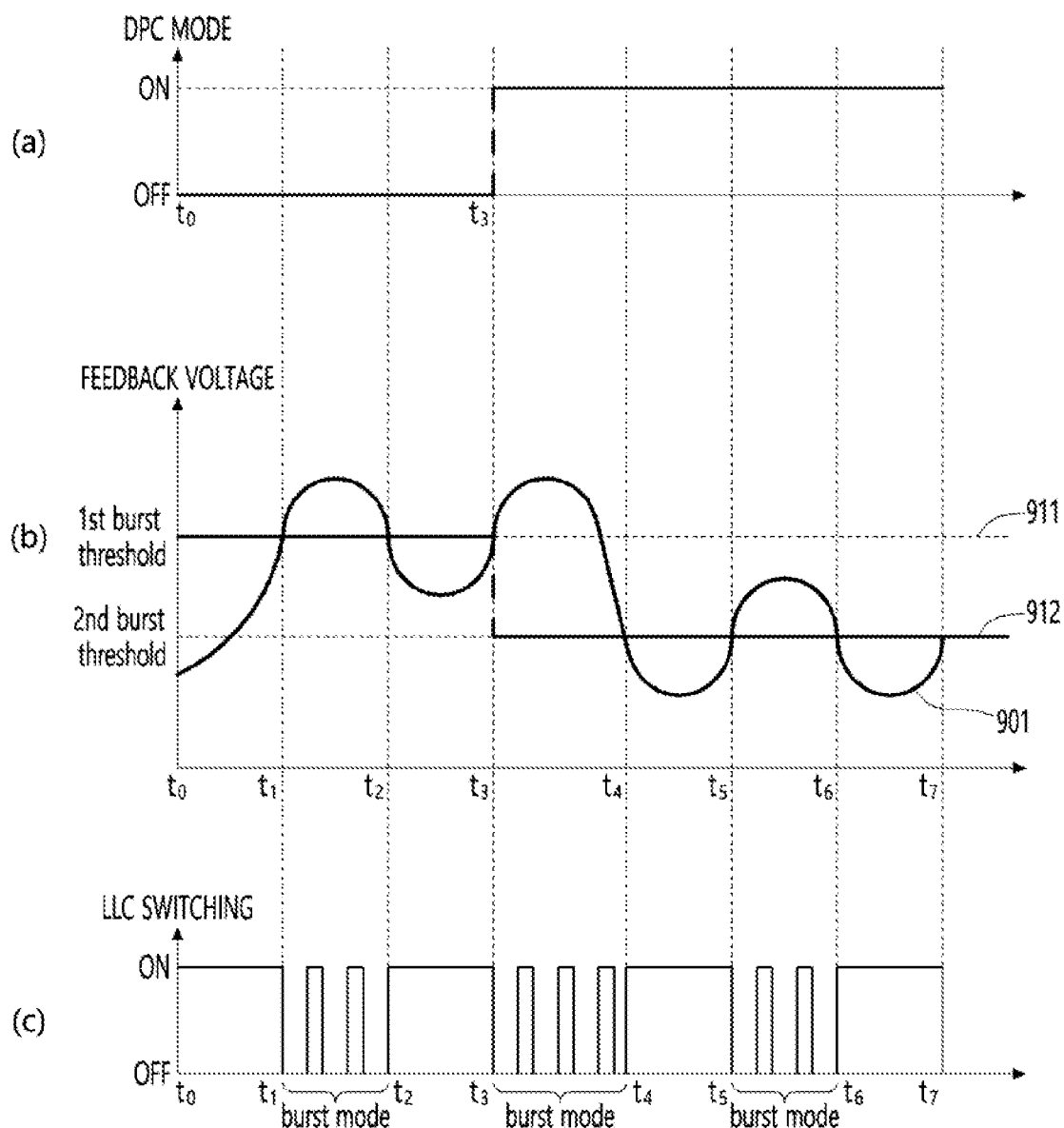
FIG. 9 is a view illustrating a power controlling method of a display apparatus according to the embodiment shown in FIG. 8.

FIG. 9 is a view illustrating a power controlling method of a display apparatus 100 according to the embodiment shown in FIG. 8.

(a) of FIG. 9 illustrates the DPC mode, (b) of FIG. 9 illustrates the output feedback voltage, and (c) of FIG. 9 illustrates switching operation of the switching unit 132. In addition, in FIG. 9, a situation in which the operating frequency is a high frequency and it is a light load is assumed.

Referring to FIG. 9, the DPC mode is in an OFF state from a time point $t_0$ to a time point $t_3$, and the DPC mode is in an ON state from a time point $t_4$. Since the DPC mode is in an OFF state from the time point $t_0$ to the time point $t_3$, the power controller 136 may compare the output feedback voltage 801 and the first burst threshold 811. In the first period $t_0$ to $t_1$, the output feedback voltage 901 may increase as the switching unit 132 operates in the normal mode, and at the time point $t_1$, the output feedback voltage 701 may reach a first burst threshold 911. The switching unit 132 operating in the normal mode may mean that the switching unit 132 continuously performs switching.

In a second period $t_1$ to $t_2$, the output feedback voltage 901 may become greater than the first burst threshold 911, and accordingly, the power controller 136 may operate the switching unit 132 in the burst mode. The switching unit 132 operating in the burst mode may mean that the switching unit 132 intermittently performs switching, and accordingly, in the second period $t_1$ to $t_2$, a process of performing switching and a process of stopping switching are alternately performed. In the second period $t_1$ to $t_2$, the output feedback voltage 901 may decrease as the switching unit 132 operates in the burst mode, and at a time point $t_2$, the output feedback voltage 901 may reach the first burst threshold 911.

In a third period $t_2$ to $t_3$, the output feedback voltage 901 may become smaller than the first burst threshold 911, and accordingly, the power controller 136 may operate the switching unit 132 in the normal mode. In the third period $t_2$ to $t_3$, the output feedback voltage 901 may increase as the switching unit 132 operates in the normal mode, and at the time point $t_3$, the output feedback voltage 901 may reach the first burst threshold 911.

As the DPC mode is in an ON state from the time point $t_3$, the power controller 136 may compare the output feedback voltage 801 and the second burst threshold 812. In a fourth period $t_3$ to $t_4$, the output feedback voltage 901 is greater than the second burst threshold 912, and accordingly, the power controller 136 may operate the switching unit 132 in the burst mode. As described above, the second burst threshold 812 is a value less than the first burst threshold 811, and accordingly, when the DPC mode is in an ON state, the output voltage may be controlled to be lower than when the DPC mode is in an OFF state.

In a fifth period $t_4$ to $t_5$, the output feedback voltage 901 may become smaller than the second burst threshold 912, and accordingly, the power controller 136 may operate the switching unit 132 in the normal mode. In the fifth period $t_4$ to $t_5$, the output feedback voltage 901 may increase as the switching unit 132 operates in the normal mode, and at the time point $t_5$, the output feedback voltage 901 may reach the second burst threshold 912.

Operations in a sixth period $t_5$ to $t_6$ and a sixth period $t_5$ to $t_6$ may be the same as those in the fourth period $t_3$ to $t_4$, and operations in a seventh period $t_6$ to $t_7$ are the same as those in the fifth period $t_4$ to $t_5$.

In FIG. 9, the burst mode operation period (or burst mode switching period) of the switching unit 132 when the DPC mode is in an ON state and when the DPC mode is in an OFF state is shown as the same, but the present disclosure is limited thereto. That is, in some embodiments, the burst mode operation periods of the switching unit 132 when the DPC mode is in an ON state and when the DPC mode is in an OFF state may be different from each other. For example, the burst mode operation period of the switching unit 132 when the DPC mode is in an ON state may be longer than the burst mode operation period of the switching unit 132 when the DPC mode is in an OFF state.

In addition, although, in FIG. 9, the switching unit 132 is shown as being switched to the burst mode immediately when the output feedback voltage 901 coincides with the first burst threshold 911 or the second burst threshold 912, the present disclosure is not limited thereto. That is, in some embodiments, even if the output feedback voltage 901 becomes greater than the first burst threshold 911 or the second burst threshold 912, the switching unit 132 may be switched to the burst mode after predetermined delay.

Figure 10:
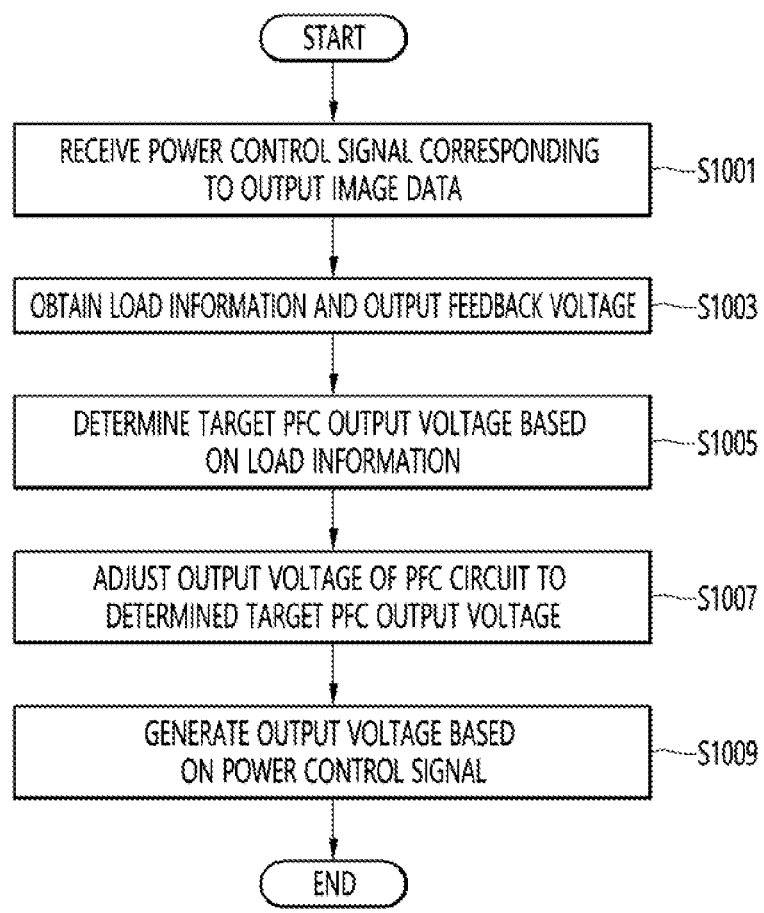
FIG. 10 is an operational flowchart illustrating a power controlling method of a display apparatus according to an embodiment of the present disclosure.

FIG. 10 is an operational flowchart illustrating a power controlling method of a display apparatus 100 according to an embodiment of the present disclosure.

Referring to FIG. 10, the power controller 136 of the display apparatus 100 may receive a power control signal corresponding to output image data (S1001).

Then, the power controller 136 of the display apparatus 100 may obtain load information and an output feedback voltage (S1003).

Then, the power controller 136 of the display apparatus 100 may determine a target PFC output voltage based on the load information (S1005).

The power controller 136 may determine the target PFC output voltage based only on the load information, and after determining the PFC output voltage adjustment value based on the load information, the target PFC output voltage may be determined based on the PFC input voltage and the PFC output voltage adjustment value.

The power controller 136 may determine the PFC output voltage to decrease as the load decreases. This is because the output gain increases as the load decreases in a situation where the LLC resonance circuit 133 operates at a high frequency.

In an embodiment, the power controller 136 may determine a target PFC output voltage corresponding to a load using a load-PFC output voltage table. For example, the load-PFC output voltage table may refer to a table in which a target PFC output voltage or a PFC output voltage adjustment value is set for each interval when the load is divided into several intervals. Table 1 below shows an example of a load-PFC output voltage table showing each load interval and a preset PFC output voltage adjustment value corresponding thereto. The load may be expressed as a percentage of a maximum load.

TABLE 1

| Load interval | PFC output voltage adjustment value |
| --- | --- |
| more than 10% of maximum load | 0 V |
| more than 5% and less than 10% of maximum load | −5 V |
| more than 3% and less than 5% of maximum load | −10 V |
| more than 1% and less than 3% of maximum load | −15 V |
| less than 1% of maximum load | −20 V |

In an embodiment, the power controller 136 may determine a target PFC output voltage corresponding to a load using a load-PFC output voltage relational expression. For example, the load-PFC output voltage relational expression may mean a linear relational expression between the load and the target PFC output voltage or the PFC output voltage adjustment value. Equation 1 below shows an example of a load-PFC output voltage relational expression representing a load L and a preset PFC output voltage adjustment value $\Delta V_{PFC\_OUTPUT}$ corresponding thereto.

$$\Delta V_{PFC\_OUTPUT} = \begin{cases} 0, & 0.1 \leq \left(\frac{L}{L_{max}}\right) \\ 100\left(\frac{L}{L_{max}}\right) - 10, & 0.05 \leq \left(\frac{L}{L_{max}}\right) < 0.1 \\ 250\left(\frac{L}{L_{max}}\right) - 22.5, & 0.01 \leq \left(\frac{L}{L_{max}}\right) < 0.05 \\ -20, & \left(\frac{L}{L_{max}}\right) < 0.01 \end{cases} \quad \text{[Equation 1]}$$

Then, the power controller 136 of the display apparatus 100 may adjust the output voltage of the PFC circuit 131 to the determined target PFC output voltage (S1007).

The power controller 136 may adjust lower the PFC output voltage as the load decreases, and the switching frequency $F_{SW}$ and the output voltage EVDD may decrease as the PFC output voltage decreases.

Then, the power controller 136 of the display apparatus 100 may generate an output voltage EVDD based on the power control signal (S1009).

The generated output voltage EVDD may be supplied to the display module 110.

Although, in FIG. 10, step S1009 of generating the output voltage based on the power control signal is shown as being performed after steps S1003 to S1007 of adjusting the output voltage of the PFC circuit 131 are performed in consideration of the load information and the output feedback voltage, steps S1003 to S1007 of adjusting the output voltage of the PFC circuit 131 in consideration of the load information and the output feedback voltage may be regarded as being in parallel with step S1009 of generating the output voltage based on the power control signal.

FIG. 10 is a diagram illustrating only one cycle of a process of adjusting the output voltage of the PFC circuit 131 in consideration of the load information, and the steps shown in FIG. 10 may be repeatedly performed. Also, some of steps S1001 to S1009 shown in FIG. 10 may be reversed in order or performed in parallel.

Figure 11:
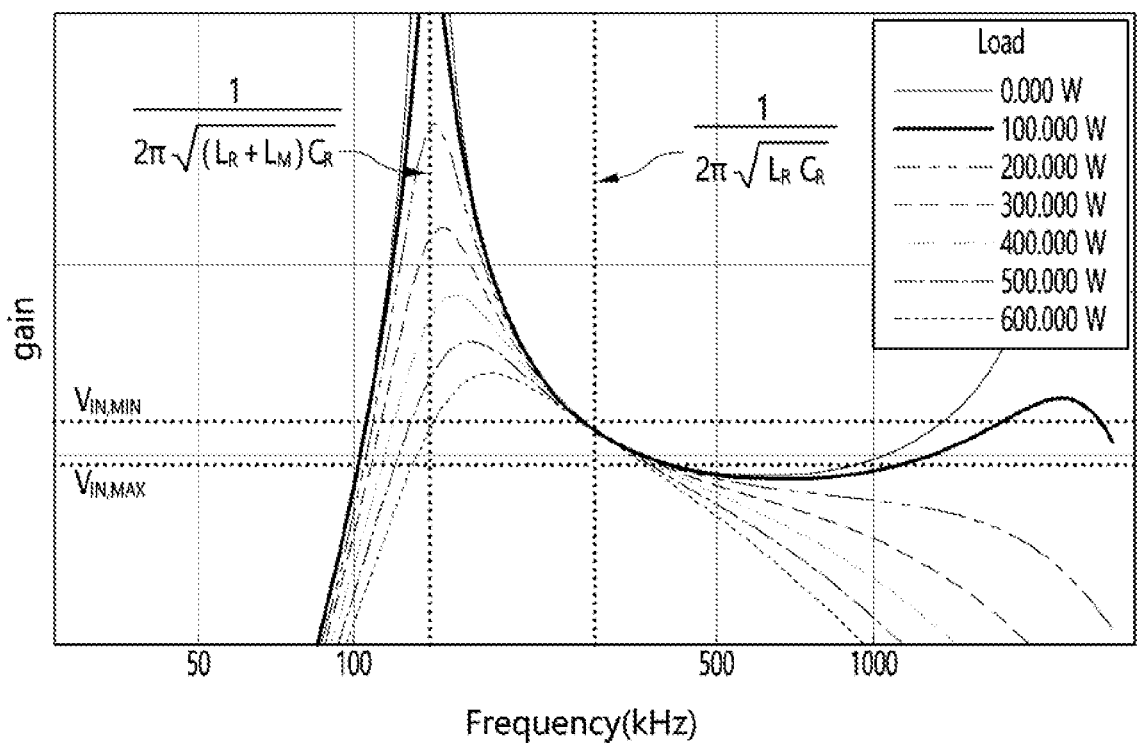
FIG. 11 is a diagram illustrating LLC gain relative to operating frequency for each load.

FIG. 11 is a diagram illustrating LLC gain relative to operating frequency for each load.

In FIG. 11, the LLC gain may mean the LLC output voltage $V_{LLC\_OUTPUT}$ relative to LLC input voltage $V_{LLC\_INPUT}$ or LLC output voltage $V_{LLC\_OUTPUT}$ relative to PFC output voltage $V_{PFC\_INPUT}$ Referring to FIG. 11, it can be seen that a peak appears in the LLC gain at around 150 kHz regardless of the load. In addition, it can be seen that, at an operating frequency greater than the peak around 150 kHz, the LLC gain tends to decrease as the operating frequency increases, but as the load decreases, the LLC gain rises (or increases) as the operating frequency increases. Specifically, it can be seen that, when the load is 200 W or more, even if the operating frequency increases, gain reduction only decreases, but when the load is 100 W or 0 W, the gain decreases and then increases again as the operating frequency increases. As described above, this is due to a phenomenon in which the output voltage rises due to secondary-side parasitic capacitance when the operating frequency increases at a light load. Therefore, by lowering the PFC output voltage (or the LCC input voltage), it is possible to prevent a phenomenon in which the output voltage increases during high-frequency operation at a light load.

Figure 12:
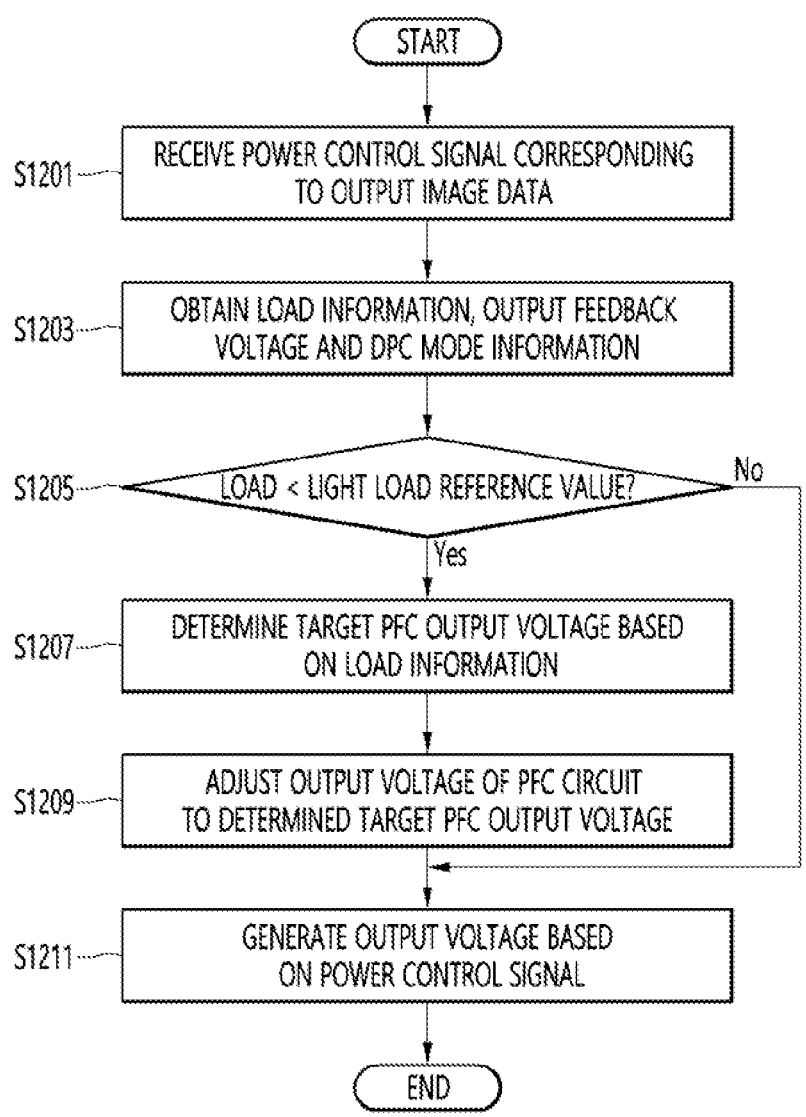
FIG. 12 is an operational flowchart illustrating a power controlling method of a display apparatus according to an embodiment of the present disclosure.

FIG. 12 is an operational flowchart illustrating a power controlling method of the display apparatus 100 according to an embodiment of the present disclosure.

Referring to FIG. 12, the power controller 136 of the display apparatus 100 receives a power control signal corresponding to output image data (S1201).

Then, the power controller 136 of the display apparatus 100 may obtains load information, an output feedback voltage, and DPC mode information (S1203).

Then, the power controller 136 of the display apparatus 100 may determine whether the load according to the load information is less than a light load reference value (S1205).

When the load is less than the light load reference value as a result of determination in step S1205, the power controller 136 of the display apparatus 100 may determine a target PFC output voltage based on the DPC mode information (S1207).

The power controller 136 may determine the target PFC output voltage based only on the DPC mode information, and determine the target PFC output voltage based on the PFC input voltage and the PFC output voltage adjustment value after determining the PFC output voltage adjustment value based on the DPC mode information.

The power controller 136 may determine a PFC output voltage when the DPC mode is in an ON state to be lower than a PFC output voltage when the DPC mode is in an OFF state. This is because when the PFC output voltage is lowered, the switching frequency $F_{SW}$ is also lowered, and accordingly, the output voltage EVDD may be lowered.

In an embodiment, the power controller 136 may determine a target PFC output voltage corresponding to a load using a DPC mode-PFC output voltage table as shown in [Table 2] or [Table 3] below.

TABLE 2

| DPC mode | PFC output voltage |
| --- | --- |
| DPC OFF | 390 V |
| DPC ON | 360 V |

TABLE 3

| DPC mode | PFC output voltage adjustment value |
| --- | --- |
| DPC OFF | 0 V |
| DPC ON | −30 V |

Then, the power controller 136 of the display apparatus 100 adjusts the output voltage of the PFC circuit 131 to the determined target PFC output voltage (S1209). When the DPC mode is in an ON state, the power controller 136 may lower the PFC output voltage compared to the case where the DPC mode is in an OFF state, and the switching frequency $F_{SW}$ and the output voltage EVDD may decrease as the PFC output voltage decreases.

In one embodiment, the power controller 136 may adjust the target PFC output voltage in consideration of both the DPC mode and the load information, which means an embodiment in which the embodiment of FIG. 10 and the embodiment of FIG. 12 are performed together.

When the load is not less than the light load reference value as a result of determination in step S1205 or after step S1209 is performed, the power controller 136 of the display apparatus 100 may output the output voltage EVDD based on the power control signal (S1211).

The generated output voltage EVDD may be supplied to the display module 110.

Although in FIG. 12, step S1211 of generating the output voltage based on the power control signal may be shown as being performed after steps S1203 to s1209 of adjusting the output voltage of the PFC circuit 131 in consideration of the DPC mode information and the output feedback voltage, steps S1203 to s1209 of adjusting the output voltage of the PFC circuit 131 in consideration of the DPC mode information and the output feedback voltage may be regarded as being performed in parallel with step S1211 of generating the output voltage based on the power control signal.

FIG. 12 is a diagram illustrating only one cycle of a process of controlling the output voltage of the PFC circuit 131 in consideration of the DPC mode information, and the steps shown in FIG. 12 may be repeatedly performed. Also, some of steps S1201 to S1209 shown in FIG. 12 may be reversed in order or performed in parallel.

Figure 13:
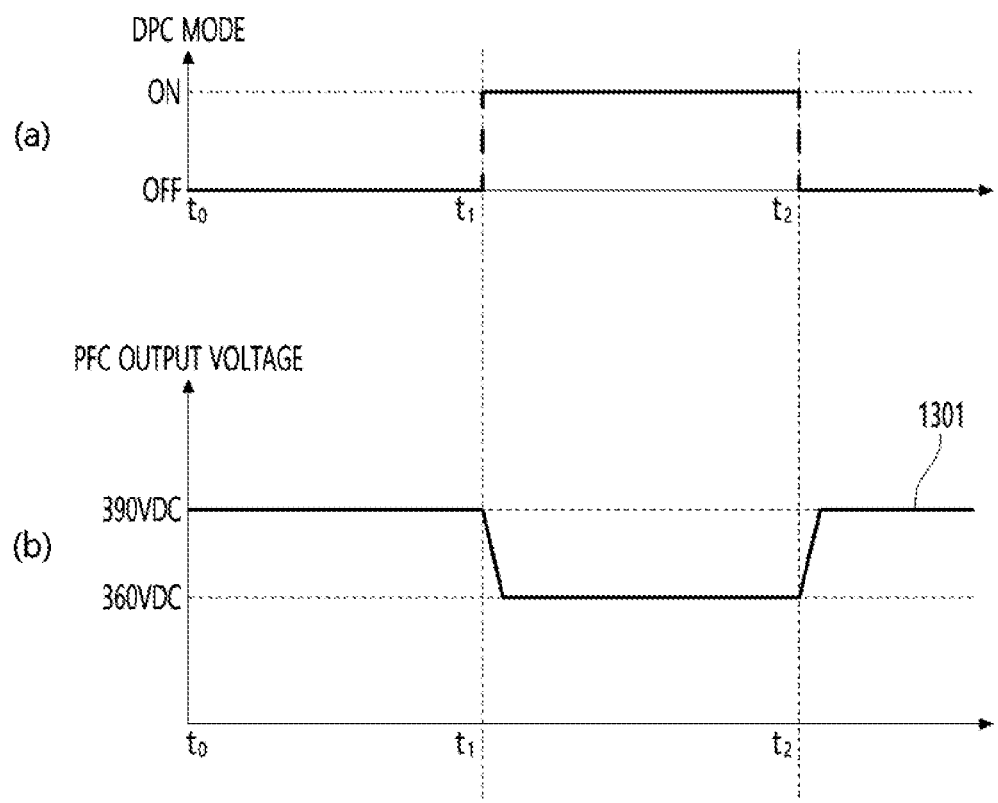
FIG. 13 is a view illustrating a power controlling method of a display apparatus according to the embodiment shown in FIG. 12.

FIG. 13 is a view illustrating a power controlling method of a display apparatus 100 according to the embodiment shown in FIG. 12.

(a) of FIG. 13 illustrates the DPC mode, and (b) of FIG. 13 illustrates the PFC output voltage. In addition, in FIG. 13, a situation where the operating frequency is a high frequency and it is a light load is assumed.

Referring to FIG. 13, the DPC mode is in an OFF state in a first period $t_0$ to $t_1$ and a third period $t_2$ to $t_3$, and the DPC mode is in an ON state in a second period $t_1$ to $t_2$. Since the DPC mode is in an OFF state in the first period $t_0$ to $t_1$, the power controller 136 may control the PFC circuit 131 to set the PFC output voltage 1301 to a preset 390 VDC.

Since the DPC mode is in an ON state in the second period $t_1$ to $t_2$, the power controller 136 may control the PFC circuit 131 to adjust the PFC output voltage 1301 to a preset 360 VDC. At the time point $t_1$, the DPC mode is converted from the OFF state to the ON state, but it may take a certain time to adjust the PFC output voltage 1301.

Since the DPC mode is in an OFF state in the third period $t_2$ to $t_3$, the power controller 136 may control the PFC circuit 131 to adjust the PFC output voltage 1301 to a preset 390 VDC. At the time point $t_2$, the DPC mode is converted from the ON state to the OFF state, but it may take a certain time to adjust the PFC output voltage 1301.

Figure 14:
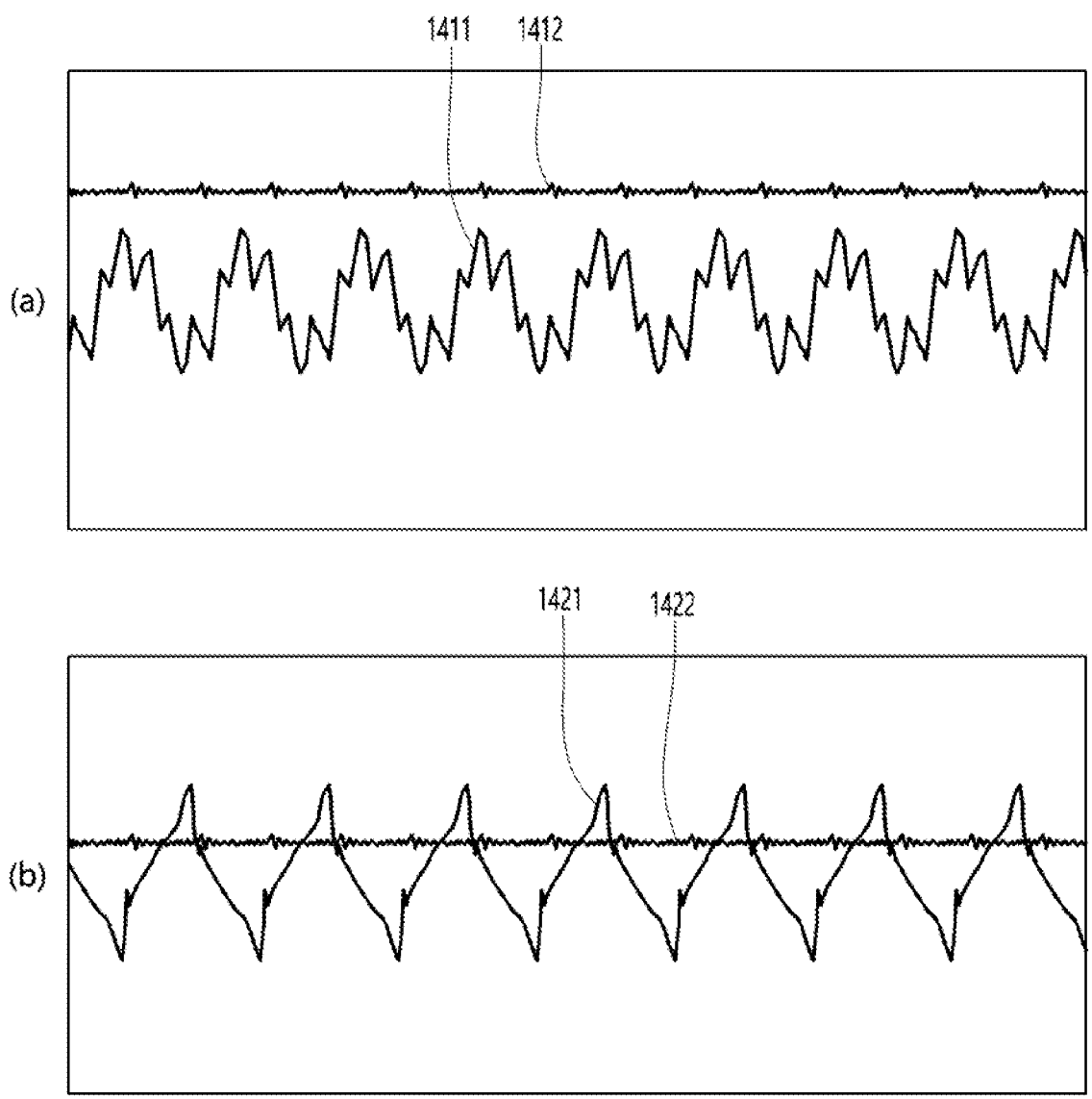
FIG. 14 is a diagram illustrating an LLC resonance voltage and an output voltage according to a PFC output voltage.

FIG. 14 is a diagram illustrating an LLC resonance voltage and an output voltage according to a PFC output voltage.

(a) of FIG. 14 illustrates the LLC resonance voltage 1411 and the output voltage 1412 when the PFC output voltage is 390V, and (b) of FIG. 14 illustrates the LLC resonance voltage 1421 and output voltage 1422 when the PFC output voltage is 360V.

Referring to (a) of FIG. 14, when the PFC output voltage is 390V, the switching frequency $F_{SW}$ is about 526 kHz and the output voltage 1412 is about 32V. On the other hand, referring to (b) of FIG. 14, when the PFC output voltage is 360V, the switching frequency $F_{SW}$ is about 430 kHz and the output voltage 1422 is about 23.8V. In this way, by lowering the PFC output voltage, the output voltage may be lowered, and accordingly, an increase in output voltage may be suppressed during light-load high-frequency operation.

Additionally, Table 4 below shows the switching frequency $F_{SW}$ and the output voltage EVDD corresponding to the PFC output voltage (or LLC input voltage) at a light load. Referring to [Table 4] below, it can be seen that the switching frequency and output voltage increase as the PFC output voltage (or LLC input voltage) increases at a light load.

TABLE 4

| LLC input voltage | DPC mode | $F_{SW}$ | EVDD |
|---|---|---|---|
| 360 V | ON | 430 kHz | 23.8 V |
| 370 V | ON | 490 kHz | 24.2 V |
| 380 V | ON | 500 kHz | 28 V |
| 395 V | ON | 526 kHz | 32 V |

Figure 15:
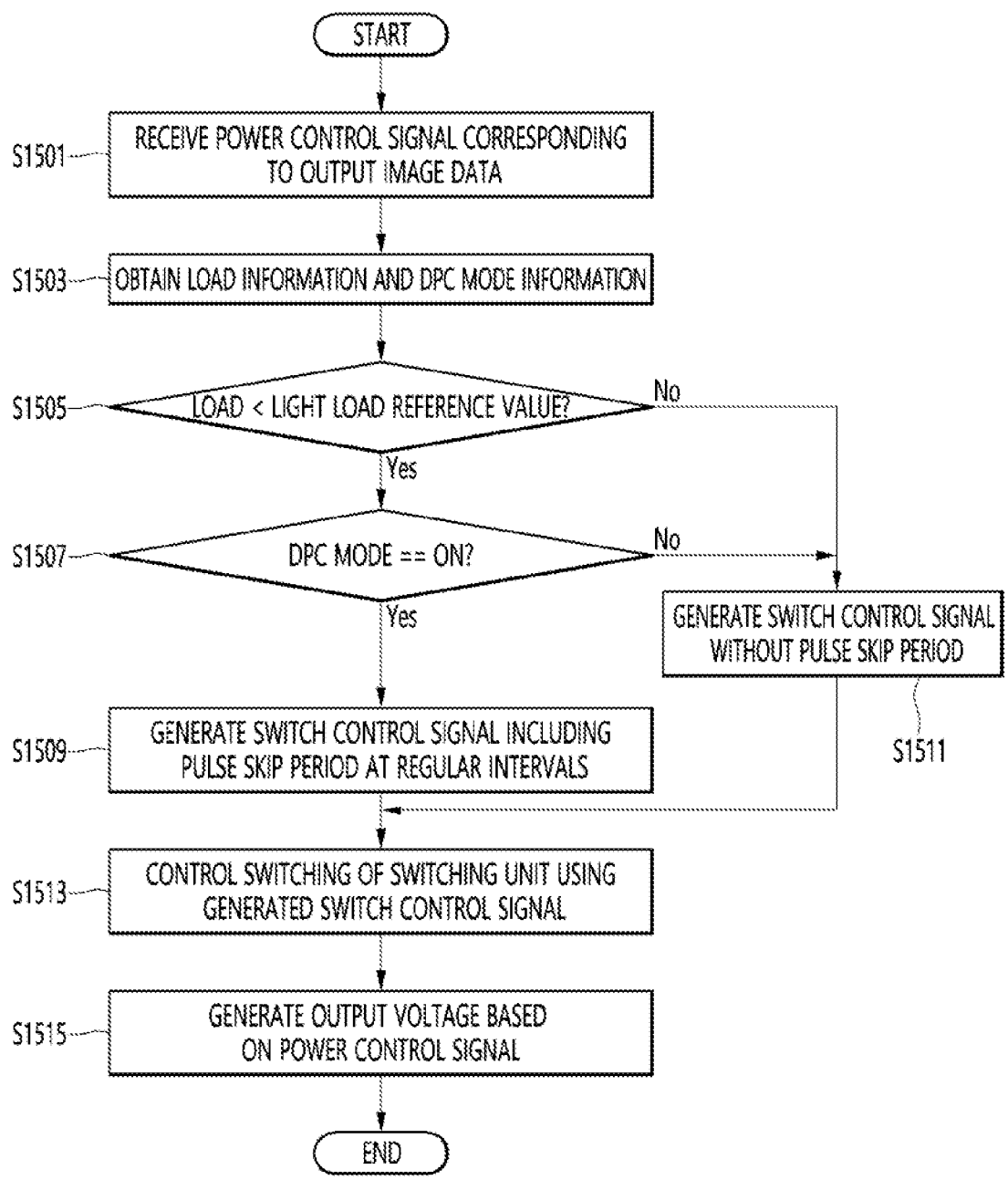
FIG. 15 is an operational flowchart illustrating a power controlling method of a display apparatus according to an embodiment of the present disclosure.

FIG. 15 is an operational flowchart illustrating a power controlling method of a display apparatus 100 according to an embodiment of the present disclosure.

Referring to FIG. 15, the power controller 136 of the display apparatus 100 may receive a power control signal corresponding to output image data (S1501).

Then, the power controller 136 of the display apparatus 100 may obtain load information and DPC mode information (S1503).

Then, the power controller 136 of the display apparatus 100 may determine whether a load according to the load information is less than a light load reference value (S1505).

If the load is less than the light load reference value as a result of determination in step S1505, the power controller 136 of the display apparatus 100 may determine whether the DPC mode is in an ON state (S1507).

When the DPC mode is in an ON state as a result of determination in step S1507, the power controller 136 of the display apparatus 100 may generate a switch control signal including a pulse skip period at regular intervals (S1509).

The power controller 136 may control switching operation of the switching unit 132, by generating a switch control signal and transmitting the generated switch control signal to the switching unit 132. The switch control signal may include Ho output and Lo output, and the pulse of the Ho output and the pulse of the Lo output are configured to be alternately turned on.

Conventionally, when the DPC mode is in an ON state, the switching frequency (pulse frequency) was increased by reducing the pulse width of the Ho output and the pulse width of the Lo output, compared to the case where the DPC mode is in an OFF state. However, as described above, the conventional method of increasing the switching frequency is inappropriate because there is a problem that the output voltage increases when the operating frequency increases at a light load.

In the present disclosure, when the DPC mode is in an ON state, compared to the case where the DPC mode is in an OFF state, the switching frequency (pulse frequency) is not changed and the switch control signal composed of the Ho output and the Lo output to skip pulses at regular intervals may be used. Since the switching frequency is not changed in the switch control signal and some pulses are skipped, energy transferred according to switching can be reduced without changing the switching frequency, and thus the output voltage can be lowered.

The power controller 136 may generate a switch control signal including a pulse skip period at regular intervals. In the generated switch control signal, the Ho output pulse and the Lo output pulse may be not included in the pulse skip period. And, in the pulse period excluding the pulse skip period in the generated switch control signal, the sum of the pulse widths of the Ho output is equal to the sum of the pulse widths of the Lo output, and accordingly, by operation of the first switch and operation of the second switch, energy transmitted to the LLC resonance circuit 133 may be kept the same.

When the load is not less than the light load reference value as a result of determination in step S1505 or the DPC mode is in an OFF state as a result of determination in step S1507, the power controller 136 of the display apparatus 100 may control the switch control signal without a pulse skip period (S1511).

Then, the power controller 136 of the display apparatus 100 may control switching of the switching unit 132 using the generated switch control signal (S1513).

Then, the power controller 136 of the display apparatus 100 may generate an output voltage EVDD based on the power control signal (S1515).

The generated output voltage EVDD may be supplied to the display module 110.

Although in FIG. 15, step S1515 of generating the output voltage based on the power control signal is shown as being performed after steps S1503 to S1513 of controlling the switching unit 132 based on the switch control signal considering the DPC mode information, steps S1503 to S1513 of controlling the switching unit 132 based on the switch control signal considering the DPC mode information may be regarded as being performed in parallel with step S1515 of generating the output voltage based on the power control signal.

FIG. 15 is a diagram illustrating only one cycle of a process of adjusting the switch control signal in consideration of the DPC mode information, and the steps shown in FIG. 15 may be repeatedly performed. Also, some of steps S1501 to S1515 shown in FIG. 15 may be reversed in order or performed in parallel.

Figure 16:
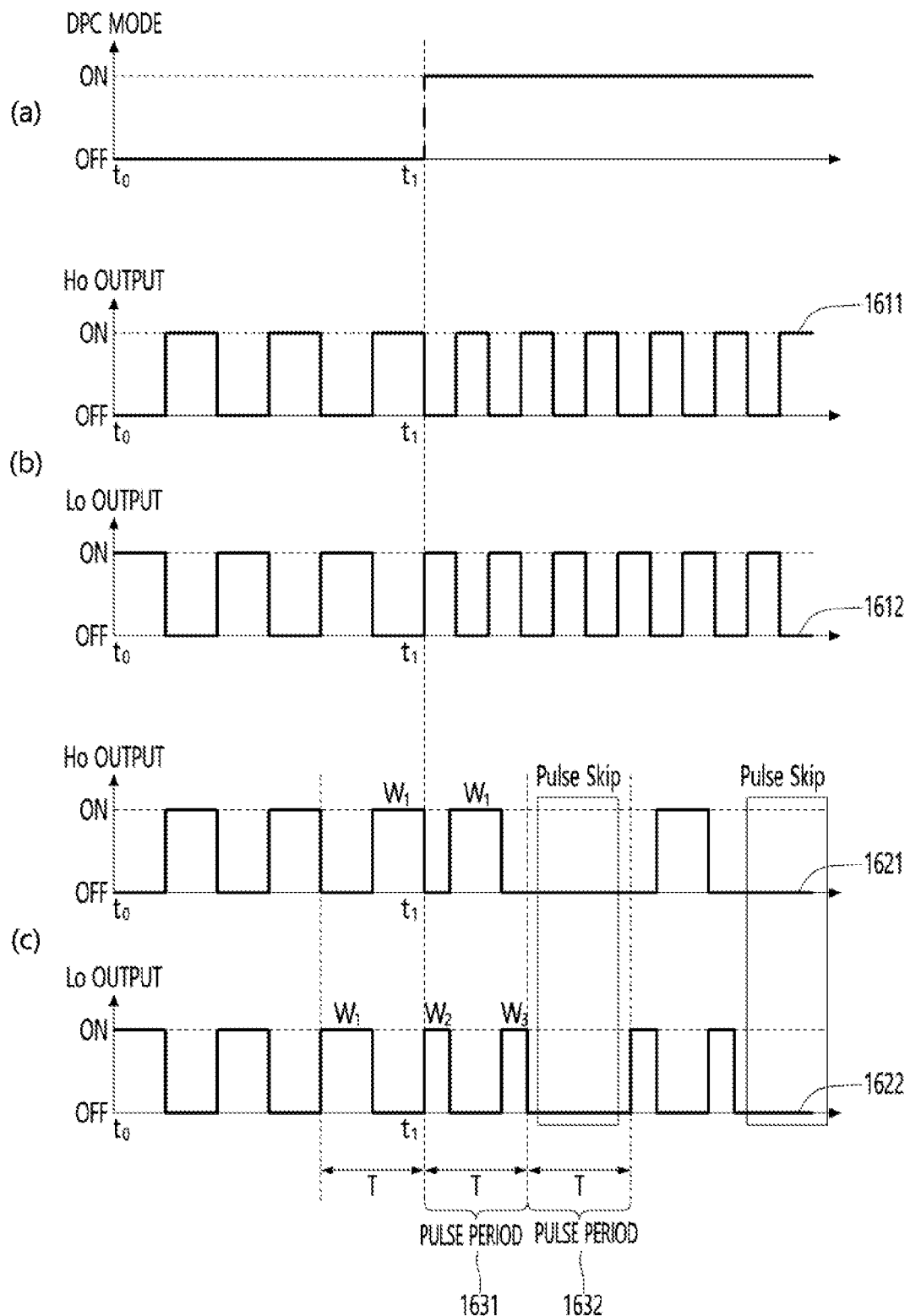
FIG. 16 is a view illustrating a power controlling method of a display apparatus according to the embodiment shown in FIG. 15.

FIG. 16 is a view illustrating a power controlling method of a display apparatus 100 according to the embodiment shown in FIG. 15.

(a) of FIG. 16 illustrates a DPC mode, (b) of FIG. 16 illustrates a conventional switch control signal, and (c) of FIG. 16 illustrates a switch control signal according to an embodiment of the present disclosure.

Referring to (a) of FIG. 16, the DPC mode is in an OFF state in a first period $t_0$ to $t_1$, and the DPC mode is in an ON state in a second period $t_1\sim$. In both the conventional switch control signal and the switch control signal according to the present disclosure, pulses having the same width of the Ho output and the Lo output are alternately turned on in the first period $t_0$ to $t_1$.

Referring to (b) of FIG. 16, in the conventional switch control signal, the pulse width of the Ho output 1611 and the Lo output 1612 in the second period $t_1\sim$ is reduced compared to the pulse width in the first period $t_0$ to $t_1$ and, accordingly, and the switching frequency may increase.

However, referring to (c) of FIG. 16, in the switch control signal according to an embodiment of the present disclosure, a switch frequency in the second period $t_1\sim$ and a switch frequency in the first period $t_0$ to $t_1$ may be maintained the same, and the pulse period 1631 and the pulse skip period 1632 may be repeated at regular intervals. The pulses of both the Ho output 1621 and the Lo output 1622 may be not included in the pulse skip period 1632, and the pulses of the Ho output 1621 and the Lo output 1622 may be included only in the pulse period 1631. The sum of pulse widths of the Ho output 1621 in one pulse period 1631 may be equal to the sum of the pulse widths of the Lo output 1622, and accordingly, in one pulse period 1631, energy supplied through the first switch and the second switch may be maintained the same. That is, in FIG. 16, the width $w_1$ of the pulse of the Ho output 1621 in the pulse period 1631 may be equal to the sum of the widths $w_2$ and $w_3$ of two pulses of the Lo output 1621. Furthermore, the widths $w_2$ and $w_3$ of the two pulses of the Lo output 1621 in the pulse period 1631 may be equal to each other.

The pulse width of Ho output or the pulse width of Lo output in the second period $t_1\sim$ to may be the same as the pulse width $w_1$ in the first period $t_0$ to $t_1$. Although FIG. 16 illustrates an embodiment in which only the pulse width of the Ho output in the second period $t_1\sim$ is the same as the pulse width $w_1$ in the first period $t_0$ to $t_1$, the present disclosure is not limited thereto. In one embodiment, only the pulse width of the Lo output in the second period $t_1\sim$ may be the same as the pulse width $w_1$ in the first period $t_0$ to $t_1$.

FIG. 16 illustrates only an embodiment in which each of the pulse period 1631 and the pulse skip period 1632 in the second period $t_1\sim$ may be equal to one pulse period T, and the present disclosure is not limited thereto. In one embodiment, each of the pulse period 1631 and the pulse skip period 1632 may be set to an integer multiple of the pulse period T.

According to an embodiment of the present disclosure, the above-described method may be implemented with codes readable by a computer on a medium in which a program is recorded. The computer-readable medium includes all types of recording devices in which data that can be read by a computer system is stored. Examples of computer-readable media include Hard Disk Drive (HDD), Solid State Disk (SSD), Silicon Disk Drive (SDD), ROM, RAM, CD-ROM, magnetic tape, floppy disk, optical data storage device, etc.

The invention claimed is:

1. A display apparatus operating at a high frequency, the display apparatus comprising:
a display module;
a control board configured to obtain load information; and
a power board including a power factor correction (PFC) circuit, a switching unit, an LLC resonance circuit, a transformer and a power controller and configured to supply an output voltage to the display module and the control board in consideration of the load information,
wherein, when a load according to the load information is less than a light load reference value, the power controller adjusts switching operation of the switching unit or a PFC output voltage of the PFC circuit to suppress an increase in gain for the output voltage,
wherein the power controller is configured to:
obtain an output feedback voltage as feedback for the output voltage and intermittently control switching of the switching unit when the output feedback voltage is greater than a first burst threshold, and
obtain dynamic power control (DPC) mode information for power consumption reduction and intermittently control switching of the switching unit when a DPC mode according to the DPC mode information is in an ON state and the output feedback voltage is greater than a second burst threshold, and
wherein the second burst threshold is less than the first burst threshold.

2. The display apparatus of claim 1, wherein the power controller is continuously configured to control switching of the switching unit when the output feedback voltage is not greater than the first burst threshold.

3. The display apparatus of claim 1, wherein the power controller is continuously configured to control switching of the switching unit when the DPC mode is in an ON state and the output feedback voltage is not greater than the second burst threshold.

4. The display apparatus of claim 1, wherein the power controller is configured to obtain an output feedback voltage as feedback for the output voltage, determine a target PFC output voltage based on the load information, and adjust the PFC output voltage to the target PFC output voltage using the output feedback voltage.

5. The display apparatus of claim 4, wherein the power controller determines the target PFC output voltage to decrease as the load decreases.

6. The display apparatus of claim 5, wherein the power controller is configured to obtain DPC mode information for power consumption reduction and determine the target PFC output voltage based on the DPC mode information.

7. The display apparatus of claim 6, wherein the power controller is configured to determine the target PFC output voltage when the DPC mode according to the DPC mode information is in an ON state to be less than the target PFC output voltage when the DPC mode is in an OFF state.

8. The display apparatus of claim 1, wherein the power controller is configured to obtain DPC mode information for power consumption reduction, generate a switch control signal based on the DPC mode information, and control switching of the switching unit using the switch control signal.

9. The display apparatus of claim 8, wherein the power controller is configured to generate the switch control signal without a pulse skip period when the DPC mode according to the DPC mode information is in an OFF state, and
wherein the pulse skip period is a period not including a switch control pulse.

10. The display apparatus of claim 9, wherein the power controller is configured to generate the switch control signal including the pulse skip period at regular intervals when the DPC mode is in an ON state.

11. The display apparatus of claim 9, wherein a frequency of the switch control signal is the same when the DPC mode is in an ON state and when the DPC mode is in an OFF state.

12. The display apparatus of claim 1, wherein the high frequency represents that an operating frequency is 300 kHz or more.

13. A power controlling method of a display apparatus operating at a high frequency, the power controlling method comprising:
obtaining load information;
adjusting switching operation of a switching unit or a PFC output voltage of a PFC circuit to suppress an increase in gain for an output voltage, when a load according to the load information is less than a light load reference value;
obtaining an output feedback voltage as feedback for the output voltage and intermittently control switching of the switching unit when the output feedback voltage is greater than a first burst threshold; and
obtaining dynamic power control (DPC) mode information for power consumption reduction and intermittently control switching of the switching unit when a DPC mode according to the DPC mode information is in an ON state and the output feedback voltage is greater than a second burst threshold,
wherein the second burst threshold is less than the first burst threshold.

* * * * *